(12) United States Patent
Jee et al.

(10) Patent No.: US 10,991,184 B2
(45) Date of Patent: Apr. 27, 2021

(54) DEVICE ENABLING COFFEE PREPARING APPARATUS TO PROVIDE USER WITH ORDERED COFFEE AND METHOD FOR OPERATING SAME

(71) Applicant: DAL.KOMM CO., LTD, Seongnam-si (KR)

(72) Inventors: Sungwon Jee, Hanam-si (KR); Youngseok Kang, Incheon (KR); Woobeom Heo, Seoul (KR)

(73) Assignee: DAL.KOMM CO., LTD, Seongnam-si (KR)

( * ) Notice: Subject to any disclaimer, the term of this patent is extended or adjusted under 35 U.S.C. 154(b) by 39 days.

(21) Appl. No.: 16/613,807

(22) PCT Filed: Jan. 23, 2018

(86) PCT No.: PCT/KR2018/000996
§ 371 (c)(1),
(2) Date: Nov. 15, 2019

(87) PCT Pub. No.: WO2018/225925
PCT Pub. Date: Dec. 13, 2018

(65) Prior Publication Data
US 2020/0175797 A1 Jun. 4, 2020

(30) Foreign Application Priority Data
Jun. 5, 2017 (KR) .................. 10-2017-0069521

(51) Int. Cl.
*G07C 9/20* (2020.01)
*A47J 31/52* (2006.01)
(Continued)

(52) U.S. Cl.
CPC .............. *G07C 9/20* (2020.01); *A47J 31/521* (2018.08); *G05B 19/042* (2013.01);
(Continued)

(58) Field of Classification Search
None
See application file for complete search history.

(56) References Cited

U.S. PATENT DOCUMENTS 9,767,474 B1* 9/2017 Ramalingam ........ G06Q 20/229
2013/0268998 A1* 10/2013 Ko ........................ H04W 12/08
726/3

FOREIGN PATENT DOCUMENTS

CN 103596473 A 2/2014
CN 105580034 A 5/2016
(Continued)

OTHER PUBLICATIONS

International Search Report in International Application No. PCT/KR2018/000996, dated Apr. 27, 2018, 2pages.

*Primary Examiner* — Carlos Garcia
(74) *Attorney, Agent, or Firm* — Park, Kim & Suh, LLC

(57) ABSTRACT

Disclosed are a device enabling coffee preparing apparatus to provide user with ordered coffee and method for operating same, which may enable the coffee preparing apparatus to block a user other than an orderer from picking up the prepared coffee and provide the prepared coffee to the orderer by generating identification information matched to a coffee order requested from each of user terminals to enable picking-up of the coffee corresponding to the coffee order, transmitting the identification information matched to the coffee order requested from each of the user terminals to each of the user terminals, transmitting an identification information input request message to a user terminal requesting a coffee order corresponding to a coffee preparation completion message from the coffee preparing apparatus, comparing identification input from a user of the user terminal in response to the identification information input request message with identification information transmitted to the user terminal, and requesting the coffee preparing (Continued)

apparatus to perform a provision operation on the coffee corresponding to the identification information transmitted to the user terminal when the input identification information is the same as the transmitted identification information.

11 Claims, 2 Drawing Sheets

(51) Int. Cl.
    *G05B 19/042*     (2006.01)
    *G06Q 30/06*     (2012.01)
    *G06Q 50/12*     (2012.01)
    *H04W 12/06*     (2021.01)

(52) U.S. Cl.
    CPC ......... *G06Q 30/0633* (2013.01); *G06Q 50/12* (2013.01); *H04W 12/06* (2013.01); *G05B 2219/2645* (2013.01)

(56) References Cited

FOREIGN PATENT DOCUMENTS

| | | |
|---|---|---|
| JP | 2005-099912 A | 4/2005 |
| JP | 4069048 B2 | 1/2008 |
| KR | 10-2013-0135623 A | 12/2013 |
| KR | 10-2014-0122930 A | 10/2014 |
| KR | 10-1706621 B1 | 2/2017 |
| KR | 10-2017-0033223 A | 3/2017 |
| WO | 2012/083194 A2 | 6/2012 |
| WO | 2015/048496 A1 | 4/2015 |

\* cited by examiner

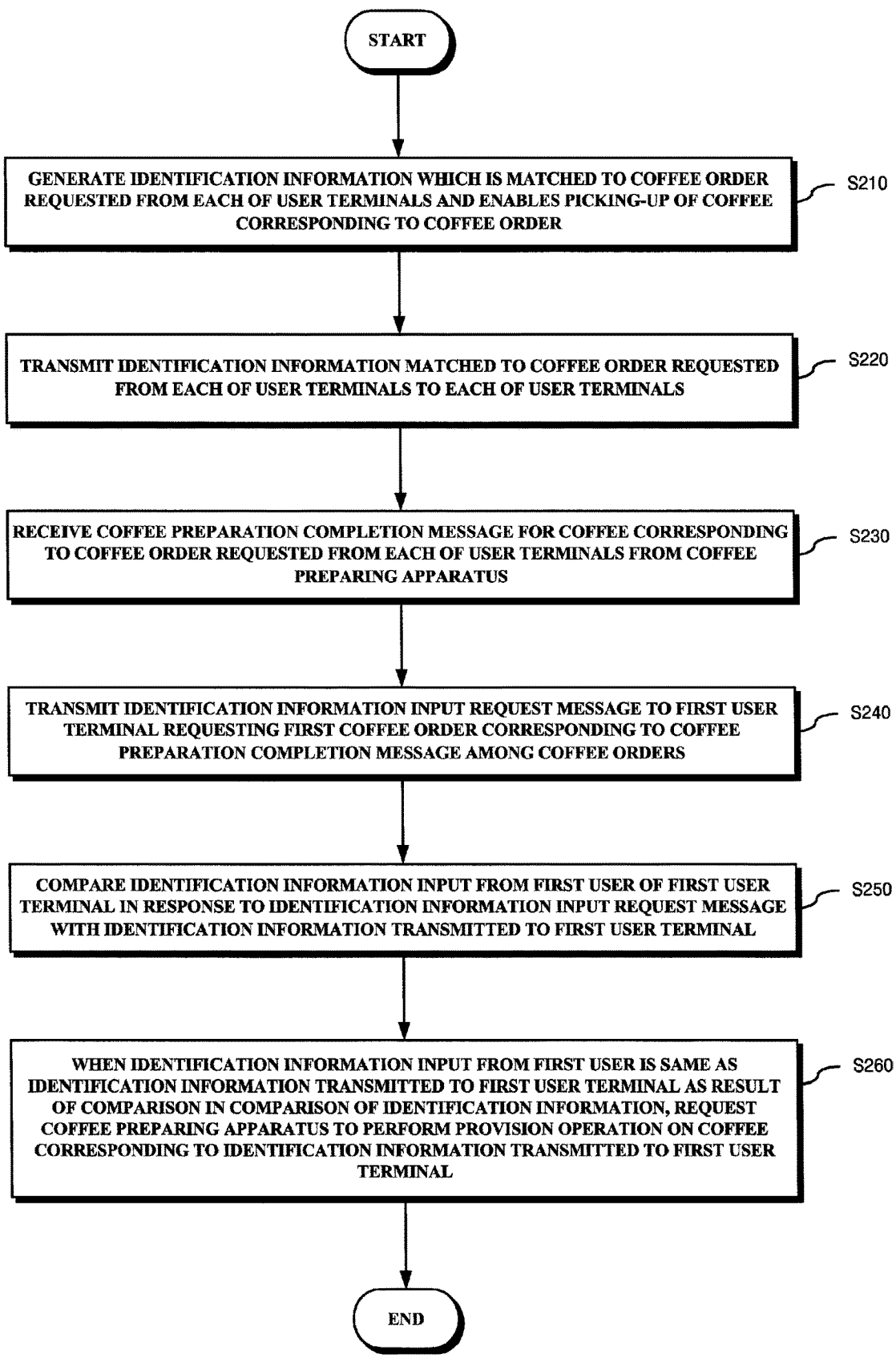

DEVICE ENABLING COFFEE PREPARING APPARATUS TO PROVIDE USER WITH ORDERED COFFEE AND METHOD FOR OPERATING SAME

CROSS-REFERENCE TO RELATED APPLICATIONS

This application is the National Stage filing under 35 U.S.C. 371 of International Application No. PCT/KR2018/000996, filed on Jan. 23, 2018, which claims the benefit of Korean Patent Application No. 10-2017-0069521, filed on Jun. 5, 2017, the contents of which are all hereby incorporated by reference herein in their entirety.

TECHNICAL FIELD

The present invention relates to a method of providing a user terminal with unique identification information matched to a coffee order and controlling a coffee preparing apparatus to enable the coffee preparing apparatus to provide a user of a user terminal with coffee corresponding to a coffee order.

BACKGROUND ART

As robot technology and artificial intelligence technology are developed, machine devices which are capable of mimicking human behaviors are being developed. As one example of the machine devices, there are automated coffee machines which discharge and mix materials according to predetermined ratios and prepare coffee, and coffee robots of which robot arms pick up and mix materials according to predetermined ratios to prepare coffee.

According to the development of the coffee robot, in order to maximize business profit by minimizing employees, such as a management staff and barista, an unmanned coffee shop in which a coffee robot which prepares coffee on behalf of a barista is placed has been launched.

In general, in the case of a manned coffee shop, an employee working at a manned coffee shop displays prepared coffee on a pickup desk and calls an orderer ordering coffee, and the orderer picks up the ordered coffee among the coffee displayed on the pickup desk. However, the foregoing coffee providing method cannot be adopted in an unmanned coffee shop in which no employee providing coffee exists.

Particularly, when a coffee preparing apparatus of an unmanned coffee shop completes preparation for coffee and then an employee displays the prepared coffee on a pickup desk and calls an orderer, there is a possibility in that a user other than the orderer picks up the prepared coffee, so that it is impossible to use an orderer calling method used in a manned coffee shop in an unmanned coffee shop.

Accordingly, there is a need for an apparatus and an operating method thereof in which a coffee preparing apparatus of an unmanned coffee shop blocks the possibility in that a user other than the orderer picks up the prepared coffee and provides the orderer with the prepared coffee.

DISCLOSURE

Technical Problem

An object of the present invention is to provide a device for enabling a coffee preparing apparatus to provide a user with ordered coffee and a method of operating the same, which may enable the coffee preparing apparatus to block a user other than an orderer from picking up the prepared coffee and provide the prepared coffee to the orderer by generating identification information matched to a coffee order requested from each of user terminals to enable picking-up of the coffee corresponding to the coffee order, transmitting the identification information matched to the coffee order requested from each of the user terminals to each of the user terminals, transmitting an identification information input request message to a user terminal requesting a coffee order corresponding to a coffee preparation completion message from the coffee preparing apparatus, comparing identification input from a user of the user terminal in response to the identification information input request message with identification information transmitted to the user terminal, and requesting the coffee preparing apparatus to perform a provision operation on the coffee corresponding to the identification information transmitted to the user terminal when the input identification information is the same as the transmitted identification information.

Technical Solution

An exemplary embodiment of the present invention provides a device for enabling a coffee preparing apparatus to provide a user with ordered coffee, the device including: an identification information generator unit, which generates identification information matched to a coffee order requested from each of user terminals to enable picking-up of the coffee corresponding to the coffee order; an identification information transmission unit, which transmits the identification information matched to the coffee order requested from each of the user terminals to each of the user terminals; a coffee preparation completion message reception unit, which receives a coffee preparation completion message for the coffee corresponding to the coffee order requested from each of the user terminals from the coffee preparing apparatus; an identification information input request unit, which transmits an identification information input request message to a first user terminal requesting a first coffee order corresponding to the coffee preparation completion message among the coffee orders; an identification information comparison unit, which compares identification information input from the a first user of the first user terminal in response to the identification information input request message with identification information transmitted to the first user terminal; and a provision request unit, which when the identification information input from the first user is the same as the identification information transmitted to the first user terminal as a result of the comparison by the identification information comparison unit, requests the coffee preparing apparatus to perform a provision operation on the coffee corresponding to the identification information transmitted to the first user terminal.

Another exemplary embodiment of the present invention provides a method of operating a device which enables a coffee preparing apparatus to provide a user with ordered coffee, the method including: generating identification information matched to a coffee order requested from each of user terminals to enable picking-up of the coffee corresponding to the coffee order; transmitting the identification information matched to the coffee order requested from each of the user terminals to each of the user terminals; receiving a coffee preparation completion message for the coffee corresponding to the coffee order requested from each of the user terminals from the coffee preparing apparatus; transmitting an identification information input request message to a first user terminal requesting a first coffee order corresponding to the coffee preparation completion message among the coffee orders; comparing identification information input from a first user of the first user terminal in response to the identification information input request message with identification information transmitted to the first user terminal; and when the identification information input from the first user is the same as the identification information transmitted to the first user terminal as a result of the comparison in the comparing of the identification information, requesting the coffee preparing apparatus to perform a provision operation on the coffee corresponding to the identification information transmitted to the first user terminal.

Advantageous Effects

The device for enabling a coffee preparing apparatus to provide a user with ordered coffee and the method of operating the same may enable the coffee preparing apparatus to block a user other than an orderer from picking up the prepared coffee and provide the prepared coffee to the orderer by generating identification information matched to a coffee order requested from each of user terminals to enable picking-up of the coffee corresponding to the coffee order, transmitting the identification information matched to the coffee order requested from each of the user terminals to each of the user terminals, transmitting an identification information input request message to a user terminal requesting a coffee order corresponding to a coffee preparation completion message from the coffee preparing apparatus, comparing identification input from a user of the user terminal in response to the identification information input request message with identification information transmitted to the user terminal, and requesting the coffee preparing apparatus to perform a provision operation on the coffee corresponding to the identification information transmitted to the user terminal when the input identification information is the same as the transmitted identification information.

DESCRIPTION OF DRAWINGS

FIG. 2 is a flowchart illustrating a method of operating the device which controls a coffee preparing apparatus so as to provide a user with ordered coffee according to an exemplary embodiment of the present invention.

MODE FOR CARRYING OUT THE INVENTION

Figure 1:
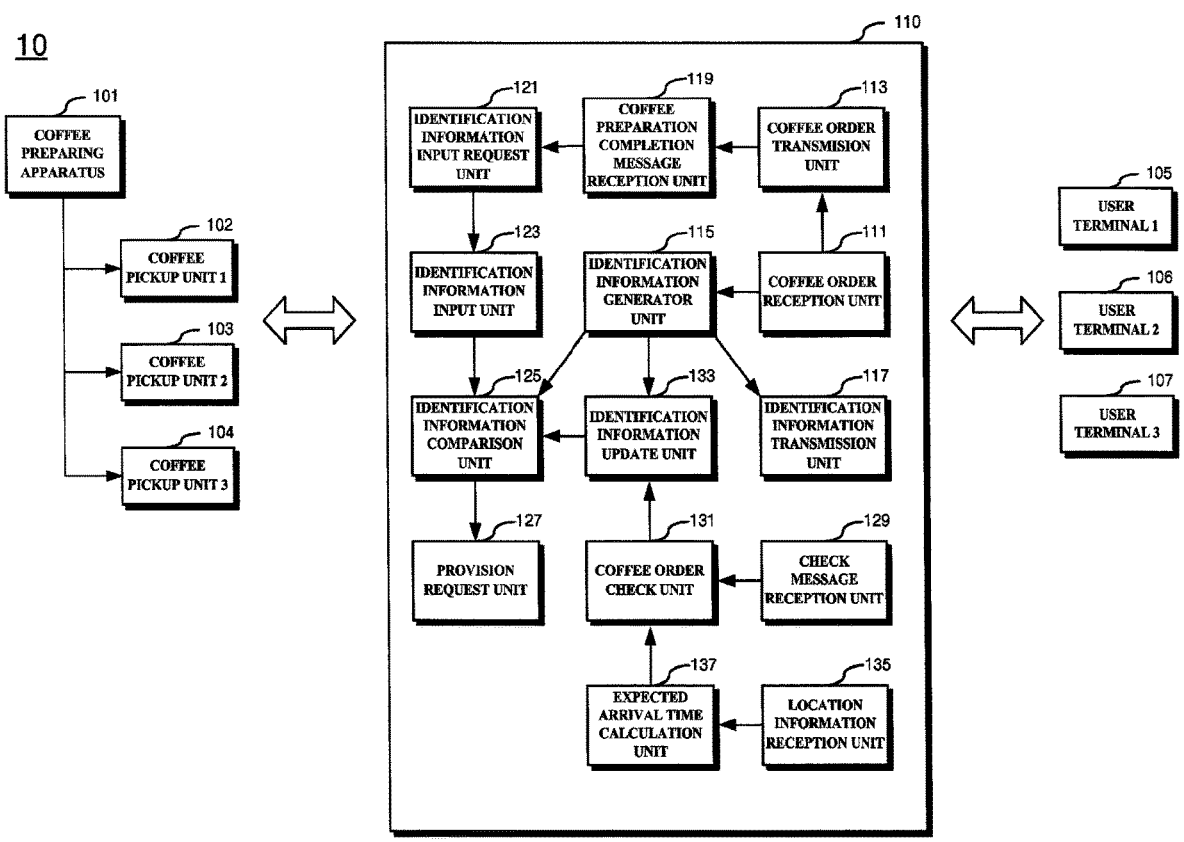
FIG. 1 is a diagram illustrating a structure of a coffee preparing apparatus management system including a device which controls a coffee preparing apparatus so as to provide a user with ordered coffee according to an exemplary embodiment of the present invention.

Hereinafter, exemplary embodiments of the present invention will be described in detail with reference to the accompanying drawings. The description is not intended to limit the present invention to the specific exemplary embodiments, and it will be appreciated that the present invention includes all modifications, equivalences, or substitutions included in the spirit and the technical scope of the present invention. In describing each drawing, similar reference numerals are used for similar constituent elements, and all terms used herein including technical or scientific terms have the same meanings as meanings which are generally understood by those skilled in the art unless they are differently defined.

Hereinafter, exemplary embodiments of the present invention will be described in detail with reference to the accompanying drawings.

FIG. 1 is a diagram illustrating a structure of a coffee pickup system 10 including a device 110 (hereinafter, referred to as a "coffee providing device") which controls a coffee preparing apparatus so as to provide a user with ordered coffee according to an exemplary embodiment of the present invention.

As illustrated in FIG. 1, the coffee pickup system 10 includes a coffee preparing apparatus 101, a plurality of user terminals 105 to 107, and the coffee providing device 110.

First, the coffee preparing apparatus 101 is the apparatus, for example, an automated coffee machine, which discharges and mixes materials stored in a material storage box according to predetermined ratios and prepares coffee, and a coffee robot, in which a robot arm picks up and then mixes materials stored in a material storage box according to predetermined ratios and prepares coffee, and prepares a coffee menu item in response to a coffee menu item preparation request received from a user terminal of a user.

The coffee preparing apparatus 101 may include a plurality of coffee pickup units 102 to 104, and for example, when the coffee preparing apparatus 101 is a coffee robot, each of the plurality of coffee pickup units 102 to 104 may be formed of a robot arm. Accordingly, the coffee preparing apparatus 101 may pick up coffee stored in a coffee storage box by using the plurality of coffee pickup units 102 to 104 in response to a request of the coffee providing device 110 and then provide a user with the coffee.

Next, the plurality of user terminals 105 to 107 is a terminal requesting a coffee order from the coffee providing device 110, and may be a portable electronic device, such as a smart phone and a Personal Digital Assistant (PDA).

Hereinafter, it is assumed that user 1 is an owner of user terminal 1 105, user 2 is an owner of user terminal 2 106, and user 3 is an owner of user terminal 3 107.

Finally, the coffee providing device 110 according to the exemplary embodiment of the present invention may include a coffee order reception unit 111, a coffee order transmission unit 113, an identification information generator unit 115, an identification information transmission unit 117, a coffee preparation completion message reception unit 119, an identification information input request unit 121, an identification information input unit 123, an identification information comparison unit 125, and a provision request unit 127.

The coffee order reception unit 111 receives a coffee order for a coffee menu item selected from the plurality of coffee menu items from each of the plurality of user terminals 105 to 107.

For example, the coffee order reception unit 111 may receive coffee orders represented in Table 1 below from the plurality of user terminals 105 to 107.

TABLE 1

| Order number | User number | Coffee menu | Order time |
|---|---|---|---|
| Order 1 | User 1 | Iced Americano | 12:01 |
| Order 2 | User 3 | Café latte | 12:07 |
| Order 3 | User 2 | Iced Americano | 12:15 |

Referring to Table 1, it can be seen that the coffee order reception unit 111 received a coffee order for iced Americano from user terminal 1 105 of user 1 at 12:01 p.m., received a coffee order for café latte from user terminal 3

107 of user 3 at 12:07 p.m., and received a coffee order for iced Americano from user terminal 2 106 of user 2 at 12:15 p.m.

Next, the coffee order transmission unit 113 transmits the coffee order of each of the plurality of user terminals 105 to 107 received by the coffee order reception unit 111 to the coffee preparing apparatus 101. Accordingly, when the coffee preparing apparatus 101 completely prepares the coffee corresponding to the coffee order of each of the user terminals 105 to 107, the coffee preparing apparatus 101 may transmit a coffee preparation completion message. Herein, the coffee reparation completion message may include information on an order number, a user number, a coffee menu item, and the like.

The identification information generator unit 115 generates identification information, which is matched to the coffee order requested from each of the user terminals and enables picking-up of the coffee corresponding to the coffee order. Particularly, the identification information generator unit 115 may generate identification information formed of a coffee order requested from each of the user terminals, the user requesting the coffee order, and a pickup code for pickup of the coffee corresponding to the coffee order.

For example, the identification information generator unit 115 may generate identification information represented in Table 2 below for the order information represented in Table 1.

TABLE 2

| Identification information number | Order number | User number | Pickup code |
| --- | --- | --- | --- |
| Identification information 1 | Order 1 | User 1 | PIN 1 |
| Identification information 2 | Order 2 | User 3 | PIN 2 |
| Identification information 3 | Order 3 | User 2 | PIN 3 |

Referring to Table 2, the identification information generator unit 115 generates identification information 1 allocating Personal Identification Number (PIN) 1 as a pickup code for matching order 1 and user 1, generates identification information 2 allocating PIN 2 as a pickup code for matching order 2 and user 3, and generates identification information 3 allocating PIN 3 as a pickup code for matching order 3 and user 2. Herein, it is illustrated that the pickup code is the PIN, which is, however, an example, and the pickup code may be formed of any one of a PIN, a Quick Response (QR) code, and a barcode.

The identification information transmission unit 117 transmits the identification information matched to the coffee order requested from each of the user terminals to each of the user terminals. Particularly, the identification information transmission unit 117 may transmit the pickup code in the identification information. In this case, the identification information transmission unit 117 may immediately transmit the identification information after the identification information generator unit 115 generates the identification information, or the coffee preparation completion message reception unit 119 may also receive the coffee preparation completion message from the coffee preparing apparatus 101 and then transmit the identification information.

The coffee preparation completion message reception unit 119 receives a coffee preparation completion message for the preparation completed coffee among the coffee orders requested from each of the user terminals 105 to 107 from the coffee preparing apparatus 101. Particularly, the coffee preparation completion message reception unit 119 receives the coffee preparation completion message for the coffee, which the coffee preparing apparatus 101 completely prepares, among the coffee orders of the plurality of user terminals 105 to 107 transmitted by the coffee order transmission unit 113 to the coffee preparing apparatus 101 from the coffee preparing apparatus 101.

The identification information input request unit 121 may transmit an identification information input request message to a first user terminal (for example, user terminal 1 105) requesting a first coffee order (for example, order 1) corresponding to the coffee preparation completion message among the coffee orders.

For example, when the coffee preparing apparatus 101 transmits the coffee preparation completion message for iced Americano corresponding to order 1 of user terminal 1 105 among the user terminals 105 to 107 and the coffee preparation completion message reception unit 119 receives the coffee preparation completion message, the identification information input request unit 121 may transmit an identification information input request message to user terminal 1 105 requesting order 1 corresponding to the coffee preparation completion message.

The identification information input unit 123 is an input device through which the user of each of the plurality of user terminals 105 to 107 is capable of inputting the identification information (particularly, the pickup code), and may be implemented with a keyboard, a touch screen, a barcode recognizer, and the like. Accordingly, the user of each of the plurality of user terminals 105 to 107 may input the identification information (particularly, the pickup code) received in each of the plurality of user terminals 105 to 107 to the identification information input unit 123 in response to the identification information input request message. Hereinafter, it is assumed that the identification information input unit 123 is implemented with a keyboard.

Further, the identification information input unit 123 may be implemented with a plurality of input devices in response to the plurality of coffee pickup units 102 to 104 of the coffee preparing apparatus 101. Particularly, the first input device of the identification information input unit 123 may be implemented at a location corresponding to coffee pickup unit 1 102 among the plurality of coffee pickup units 102 to 104 of the coffee preparing apparatus 101, the second input device may be implemented at a location corresponding to coffee pickup unit 2 103, and the third input device may be implemented at a location corresponding to coffee pickup unit 3 104.

The identification information comparison unit 125 compares the identification information (particularly, the pickup code) input from the user of each of the plurality of user terminals 105 to 107 in response to the identification information input request message with the identification information (particularly, the pickup code) transmitted to each of the plurality of user terminals 105 to 107, and determines whether the identification information (particularly, the pickup code) input from the user of each of the plurality of user terminals 105 to 107 is the same as the identification information (particularly, the pickup code) transmitted to each of the plurality of user terminals 105 to 107. That is, the identification information comparison unit 125 may compare the identification information input from the first user terminal in response to the identification information input request message with the identification information transmitted to the first user terminal.

When the identification information (particularly, the pickup code) input from the user of each of the plurality of user terminals 105 to 107 is the same as the identification information (particularly, the pickup code) transmitted to each of the plurality of user terminals 105 to 107 as a result of the comparison by the identification information comparison unit 125, the provision request unit 127 requests the coffee preparing apparatus 101 to perform a provision operation on the coffee corresponding to the identification information transmitted to each of the plurality of user terminals 105 to 107. Accordingly, the coffee preparing apparatus 101 picks up the coffee corresponding to the identification information transmitted to each of the plurality of user terminals 105 to 107 by using the plurality of coffee pickup units 102 to 104 in response to the request for the provision operation on the coffee and then provides the user with the coffee. In this case, when the identification information is input from the first input device of the identification information input unit 123, the provision request unit 127 may request the coffee preparing apparatus 101 to perform the provision operation on the coffee by using coffee pickup unit 1 102 corresponding to the first input device. That is, when the identification information input from the first user is the same as the identification information transmitted to the first user terminal as a result of the comparison of the identification information comparison unit 125, the provision request unit 127 may request the coffee preparing apparatus 101 to perform the provision operation on the coffee corresponding to the identification information transmitted to the first user terminal.

As described above, the coffee providing device 110 according to the exemplary embodiment of the present invention may enable the coffee preparing apparatus 101 to block a possibility in that a user other than the orderer picks up the prepared coffee and provide the orderer with the prepared coffee.

Additionally, referring to FIG. 1, the coffee providing device 110 according to the exemplary embodiment of the present invention may further include a check message reception unit 129, a coffee order checking unit 131, and a location information reception unit 135.

The check message reception unit 129 may receive a check message for the identification information input request message from the user terminal to which the identification information input request unit 121 transmits the identification information input request message. Herein, the check message may include a pickup possible message indicating that it is possible to pick up the coffee within a predetermined pickup time (for example, 8 minutes) in response to the identification information input request message and a pickup impossible message indicating that it is impossible to pick up the coffee within a predetermined pickup time (for example, 8 minutes) in response to the identification information input request message.

When the check message reception unit 129 fails to receive the check message within a predetermined response time (for example, 5 minutes) after the transmission of the identification information input request message, the coffee order checking unit 131 checks a coffee order ordering the same coffee as the coffee corresponding to the coffee preparation completed coffee order. That is, when the coffee order checking unit 131 fails to receive the check message within a predetermined first time after the check message reception unit 129 transmits the identification information input request message, the coffee order checking unit 131 checks a second coffee order ordering the same coffee as the coffee corresponding to the first coffee order among the coffee orders.

For example, when the coffee preparation completion message reception unit 119 receives the coffee preparation completion message for the coffee corresponding to order 1, and the coffee preparation completion message reception unit 119 fails to receive the check message within a predetermined response time (for example, 5 minutes) after the identification information input request unit 121 transmits the identification information input request message to user terminal 1 105 requesting order 1, the coffee order checking unit 131 checks order 3 ordering iced Americano corresponding to order 1.

Further, when the check message reception unit 129 receives the pickup impossible message indicating that it is impossible to pick up the coffee corresponding to the coffee preparation completion message within a predetermined response time (for example, five minutes) after the transmission of the identification information input request message, the coffee order checking unit 131 checks a coffee order ordering the same coffee as the coffee corresponding to the coffee preparation completed coffee order.

An identification information update unit 133 matches the identification information matched to the first coffee order to the second coffee order, and matches the identification information matched to the second coffee order to the first coffee order to update the identification information. That is, the identification information update unit 133 matches the identification information matched to the first coffee order to the second coffee order and matches the identification information matched to the second coffee order to the first coffee order to update the identification information.

For example, the identification information update unit 133 may update the identification information represented in Table 3 below.

TABLE 3

| Identification information number | Order number | User number | Pickup code |
| --- | --- | --- | --- |
| Identification information 1 | Order 1 | User 2 | PIN 3 |
| Identification information 2 | Order 2 | User 3 | PIN 2 |
| Identification information 3 | Order 3 | User 1 | PIN 1 |

Referring to Table 3, the identification information update unit 133 updates identification information 1 and identification information 2 so that PIN 1 matching order 1 and user 1 matches order 3 and user 1, and PIN 3 matching order 3 and user 2 matches order 1 and user 2.

Then, the identification information input request unit 121 transmits the identification information input request message to a second user terminal requesting the second coffee order, the identification information comparison unit 125 compares the identification information input from the second user of the second user terminal in response to the identification information input request message with the identification information transmitted to the second user terminal, and when the identification information input from the second user is the same as the identification information transmitted to the second user terminal as a result of the comparison by the identification information comparison unit, the provision request unit 127 requests the coffee preparing apparatus to perform the provision operation on the coffee corresponding to the identification information transmitted to the second user terminal.

As described above, the coffee providing device 110 according to the exemplary embodiment of the present invention may enable the coffee preparing apparatus 101 to block a possibility in that a user other than the orderer picks up the prepared coffee and provide the orderer with the prepared coffee, and enable the coffee preparing apparatus 101 to first provide another orderer ordering the same coffee with the coffee when the orderer arrives late.

Additionally, referring to FIG. 1, the coffee providing device 110 according to the exemplary embodiment of the present invention may further include a location information reception unit 135 and an expected arrival time calculation unit 137.

The location information reception unit 135 receives location information about each of the user terminals 105 to 107 from each of the user terminals 105 to 107 at a predetermined time interval (for example, 10 seconds). Herein, the location information may be the location information measured by a Global Positioning System (GPS), a Global Navigation Satellite System (GLONASS), a Wi-Fi based Positioning System (WPS), and the like.

The expected arrival time calculation unit 137 calculates an expected arrival time of each of the user terminals 105 to 107 based on the location information received at the predetermined time interval. Particularly, the expected arrival time calculation unit 137 may calculate a current location and a movement speed of user terminal 1 105 based on location information about user terminal 1 105 among the user terminals 105 to 107, and calculate an expected arrival time of user terminal 1 105 based on the calculated current location and movement speed.

In this case, when the expected arrival time calculated by the expected arrival time calculation unit 137 exceeds a predetermined pickup time (for example, 8 minutes), the coffee order checking unit 131 checks a coffee order ordering the same coffee as the coffee corresponding to the coffee preparation completed coffee order. That is, when the expected arrival time of the first user terminal exceeds a predetermined pickup time (for example, 8 minutes), the coffee order checking unit 131 checks a second coffee order ordering the same coffee as the coffee corresponding to the first coffee order among the coffee orders.

Then, the identification information update unit 133 matches identification information matched to the first coffee order to the second coffee order and identification information matched to the second coffee order to the first coffee order to update the identification information, the identification information input request unit 121 transmits an identification information input request message to the second user terminal requesting the second coffee order, the identification information comparison unit 125 compares the identification information input from the second user of the second user terminal in response to the identification information input request message with the identification information transmitted to the second user terminal, and the provision request unit 127 requests the coffee preparing apparatus to perform a provision operation on the coffee corresponding to the identification information transmitted to the second user terminal when the identification information input from the second user is the same as the identification information transmitted to the second user terminal as a result of the comparison of the identification information comparison unit.

As described above, the coffee providing device 110 according to the exemplary embodiment of the present invention may enable the coffee preparing apparatus 101 to block a possibility in that a user other than the orderer picks up the prepared coffee and provide the orderer with the prepared coffee, and enable the coffee preparing apparatus 101 to first provide another orderer ordering the same coffee with the coffee when the orderer arrives late.

FIG. 2 is a flowchart illustrating a method of operating the device which controls the coffee preparing apparatus so as to provide a user with ordered coffee according to an exemplary embodiment of the present invention.

Referring to FIG. 2, in operation S210, identification information, which is matched to a coffee order requested from each of user terminals and enables picking-up of coffee corresponding to the coffee order, is generated.

In operation S220, the identification information matched to the coffee order requested from each of the user terminals is transmitted to each of the user terminals.

In operation S230, a coffee preparation completion message for the coffee corresponding to the coffee order requested from each of the user terminals is received from the coffee preparing apparatus.

In operation S240, an identification information input request message is transmitted to a first user terminal requesting a first coffee order corresponding to the coffee preparation completion message among the coffee orders.

In operation S250, identification information input from a first user of the first user terminal in response to the identification information input request message is compared with identification information transmitted to the first user terminal.

In operation S260, when the identification information input from the first user is the same as the identification information transmitted to the first user terminal as a result of the comparison in the comparison of the identification information, the coffee preparing apparatus is requested to perform a provision operation on the coffee corresponding to the identification information transmitted to the first user terminal.

In the meantime, operation S220 may be performed after operation S230. That is, in operation S220, when a coffee preparation completion message for the coffee corresponding to the coffee order requested from each of the user terminals is received from the coffee preparing apparatus, the identification information may be transmitted.

In the meantime, after operation S240, when the check message is not received within a predetermined first time after the transmission of the identification information input request message, the coffee preparing apparatus may further perform checking a second coffee order ordering the same coffee as the coffee corresponding to the first coffee order among the coffee orders, matching the identification information matched to the first coffee order to the second coffee order and matching identification information matched to the second coffee order to the first coffee order to update the identification information, transmitting an identification information input request message to a second user terminal requesting the second coffee order, comparing identification information input from a second user of the second user terminal in response to the identification information input request message with identification information transmitted to the second user terminal, and when the identification information input from the second user is the same as the identification information transmitted to the second user terminal as a result of the comparison in the comparing of the identification information input from the second user of the second user terminal with the identification information transmitted to the second user terminal, requesting the coffee preparing apparatus to perform a provision operation on the coffee corresponding to the identification information transmitted to the second user terminal. In this case, operations S250 and S260 may be performed when the identification information input request message is transmitted and then the check message is received within a predetermined first time. In the meantime, the checking of the second coffee order may be the operation of checking the second coffee order ordering the same coffee as the coffee corresponding to the first coffee order among the coffee orders when a pickup impossible message indicating that it is impossible to pick up the coffee corresponding to the coffee preparation completion message is received from the first user terminal within the predetermined first time.

In the meantime, after operation S240, the coffee preparing apparatus may further perform receiving location information about each of the user terminals from each of the user terminals at a predetermined time interval, calculating an expected arrival time of the first user terminal based on the location information received as the predetermined time interval, when the expected arrival time of the first user terminal exceeds a predetermined second time after the identification information input request message is transmitted, checking a second coffee order ordering the same coffee as the coffee corresponding to the first coffee order among the coffee orders, matching the identification information matched to the first coffee order to the second coffee order and matching identification information matched to the second coffee order to the first coffee order to update the identification information, transmitting an identification information input request message to a second user terminal requesting the second coffee order, comparing identification information input from a second user of the second user terminal in response to the identification information input request message with the identification information transmitted to the second user terminal, and when the identification information input from the second user is the same as the identification information transmitted to the second user terminal as a result of the comparison in the comparing of the identification information input from the second user of the second user terminal with the identification information transmitted to the second user terminal, requesting the coffee preparing apparatus to perform a provision operation on the coffee corresponding to the identification information transmitted to the second user terminal. In this case, operations S250 and S260 may be performed when the check message is received within a predetermined first time after the identification information input request message is transmitted.

In the foregoing, the method of operating the device controlling the coffee preparing apparatus so as to provide a user with ordered coffee according to the exemplary embodiment of the present invention has been described with reference to FIG. 2. Herein, the method of operating the device controlling the coffee preparing apparatus so as to provide a user with ordered coffee according to the exemplary embodiment of the present invention may correspond to the configuration of the operation of the device controlling the coffee preparing apparatus so as to provide a user with ordered coffee according to the exemplary embodiment of the present invention described with reference to FIG. 1, so that a more detailed description therefor will be omitted.

The method of operating the device controlling the coffee preparing apparatus so as to provide a user with ordered coffee according to the exemplary embodiment of the present invention may be implemented by a computer program stored in a storage medium for executing the computer program through a combination with a computer.

Further, the method of operating the device controlling the coffee preparing apparatus so as to provide a user with ordered coffee according to the exemplary embodiment of the present invention may be implemented in the form of a program command executable through various computer means and be recorded in a computer readable medium. The computer readable medium may include solely or a combination of a program command, a data file, a data structure, and the like. The program command recorded in the medium may be specially designed and configured for the present invention or may be published to those skilled in the computer software and usable. Examples of the computer readable recording medium include a magnetic medium, such as a hard disk, a floppy disk, or a magnetic tape, an optical recording medium, such as a CD-ROM or a DVD, a magneto-optical medium, such as a floptical disk, and a hardware device which is specifically configured to store and execute the program command such as a ROM, a RAM, and a flash memory. An example of the program command includes a high-level language code executable by a computer by using an interpreter, and the like, as well as a machine language code created by a compiler.

As described above, the present invention has been described by the specific matters, such as a specific component, limited embodiments, and drawings, but these are provided only for helping general understanding of the present invention, and the present invention is not limited to the exemplary embodiments, and those skilled in the art will appreciate that various modifications, additions and substitutions are possible from the disclosure.

The spirit of the present invention is defined by the appended claims rather than by the description preceding them, and all changes and modifications that fall within metes and bounds of the claims, or equivalents of such metes and bounds are therefore intended to be embraced by the range of the spirit of the present invention.

The invention claimed is:

1. A device for controlling a coffee preparing apparatus to provide a user with ordered coffee, the device comprising a processor configured to:
   generate identification information matched to a coffee order requested from each of user terminals to enable picking-up of the coffee corresponding to the coffee order;
   transmit the identification information matched to the coffee order requested from each of the user terminals to each of the user terminals;
   receive a coffee preparation completion message for the coffee corresponding to the coffee order requested from each of the user terminals from the coffee preparing apparatus;
   transmit an identification information input request message to a first user terminal requesting a first coffee order corresponding to the coffee preparation completion message among the coffee orders;
   compare identification information input from a first user of the first user terminal in response to the identification information input request message with identification information transmitted to the first user terminal; and
   request the coffee preparing apparatus to perform a provision operation on the coffee corresponding to the identification information transmitted to the first user terminal when the identification information input from the first user is the same as the identification information transmitted to the first user terminal as a result of the comparison.

2. The device of claim 1, wherein the processor is further configured to:
receive a check message for the identification information input request message from the first user terminal;
check a second coffee order ordering the same coffee as the coffee corresponding to the first coffee order among the coffee orders when the processor fails to receive the check message within a predetermined first time after the transmission of the identification information input request message; and
match the identification information matched to the first coffee order to the second coffee order, and match the identification information matched to the second coffee order to the first coffee order to update the identification information;
wherein the processor transmits the identification information input request message to a second user terminal requesting the second coffee order,
wherein the processor compares identification information input from a second user of the second user terminal in response to the identification information input request message with identification information transmitted to the second user,
wherein the processor requests the coffee preparing apparatus to perform the provision operation on the coffee corresponding to the identification information transmitted to the second user terminal when the identification information input from the second user is the same as the identification information transmitted to the second user terminal as a result of the comparison.

3. The device of claim 2, wherein when the processor receives a pickup impossible message indicating that it is impossible to pick up the coffee corresponding to the coffee preparation completion message from the first user terminal within a predetermined first time, the processor checks a second coffee order ordering the same coffee as the coffee corresponding to the first coffee order among the coffee orders.

4. The device of claim 1, wherein the processor is further configured to:
receive location information about each of the user terminals from each of the user terminals at a predetermined time interval;
calculate an expected arrival time of the first user terminal based on the location information received at the predetermined time interval;
check a second coffee order ordering the same coffee as the coffee corresponding to the first coffee order among the coffee orders when the expected arrival time of the first user terminal exceeds a predetermined second time after the transmission of the identification information input request message; and
match the identification information matched to the first coffee order to the second coffee order, and match the identification information matched to the second coffee order to the first coffee order to update the identification information,
wherein the processor transmits the identification information input request message to a second user terminal requesting the second coffee order,
wherein the processor compares identification information input from a second user of the second user terminal in response to the identification information input request message with identification information transmitted to the second user,
wherein the processor requests the coffee preparing apparatus to perform the provision operation on the coffee corresponding to the identification information transmitted to the second user terminal when the identification information input from the second user is the same as the identification information transmitted to the second user terminal as a result of the comparison.

5. The device of claim 1, wherein when a coffee preparation completion message for the coffee corresponding to the coffee order requested from each of the user terminals is received from the coffee preparing apparatus, the processor transmits the identification information.

6. A method of operating a device which controls a coffee preparing apparatus to provide a user with ordered coffee, the method comprising:
generating identification information matched to a coffee order requested from each of user terminals to enable picking-up of the coffee corresponding to the coffee order;
transmitting the identification information matched to the coffee order requested from each of the user terminals to each of the user terminals;
receiving a coffee preparation completion message for the coffee corresponding to the coffee order requested from each of the user terminals from the coffee preparing apparatus;
transmitting an identification information input request message to a first user terminal requesting a first coffee order corresponding to the coffee preparation completion message among the coffee orders;
comparing identification information input from the a first user of the first user terminal in response to the identification information input request message with identification information transmitted to the first user terminal; and
when the identification information input from the first user is the same as the identification information transmitted to the first user terminal as a result of the comparison in the comparing of the identification information, requesting the coffee preparing apparatus to perform a provision operation on the coffee corresponding to the identification information transmitted to the first user terminal.

7. The method of claim 6, further comprising:
when the check message is not received within a predetermined first time after the transmission of the identification information input request message, checking a second coffee order ordering the same coffee as the coffee corresponding to the first coffee order among the coffee orders;
matching the identification information matched to the first coffee order to the second coffee order and matching the identification information matched to the second coffee order to the first coffee order to update the identification information;
transmitting the identification information input request message to a second user terminal requesting the second coffee order;
comparing identification information input from a second user of the second user terminal in response to the identification information input request message with identification information transmitted to the second user, and
when the identification information input from the second user is the same as the identification information transmitted to the second user terminal as a result of the comparison in the comparing between the identification information input from the second user of the second user terminal and the identification information transmitted to the second user, requesting the coffee preparing apparatus to perform the provision operation on the coffee corresponding to the identification information transmitted to the second user terminal.

8. The method of claim 7, wherein the checking of the second coffee order includes, when a pickup impossible message indicating that it is impossible to pick up the coffee corresponding to the coffee preparation completion message is received from the first user terminal within a predetermined first time, checking a second coffee order ordering the same coffee as the coffee corresponding to the first coffee order among the coffee orders.

9. The method of claim 6, further comprising:
receiving location information about each of the user terminals from each of the user terminals at a predetermined time interval;
calculating an expected arrival time of the first user terminal based on the location information received at the predetermined time interval;
when the expected arrival time of the first user terminal exceeds a predetermined second time after the transmission of the identification information input request message, checking a second coffee order ordering the same coffee as the coffee corresponding to the first coffee order among the coffee orders;
matching the identification information matched to the first coffee order to the second coffee order and matching the identification information matched to the second coffee order to the first coffee order to update the identification information;
transmitting the identification information input request message to a second user terminal requesting the second coffee order;
comparing identification information input from a second user of the second user terminal in response to the identification information input request message with identification information transmitted to the second user; and
when the identification information input from the second user is the same as the identification information transmitted to the second user terminal as a result of the comparison in the comparing between the identification information input from the second user of the second user terminal and the identification information transmitted to the second user terminal, requesting the coffee preparing apparatus to perform the provision operation on the coffee corresponding to the identification information transmitted to the second user terminal.

10. The method of claim 6, wherein the transmitting of the identification information includes, when a coffee preparation completion message for the coffee corresponding to the coffee order requested from each of the user terminals is received from the coffee preparing apparatus, transmitting the identification information.

11. A non-transitory computer readable recording medium having a program recorded therein for allowing a computer to execute a method of operating a device which controls a coffee preparing apparatus to provide a user with ordered coffee, the method comprising:
generating identification information matched to a coffee order requested from each of user terminals to enable picking-up of the coffee corresponding to the coffee order;
transmitting the identification information matched to the coffee order requested from each of the user terminals to each of the user terminals;
receiving a coffee preparation completion message for the coffee corresponding to the coffee order requested from each of the user terminals from the coffee preparing apparatus;
transmitting an identification information input request message to a first user terminal requesting a first coffee order corresponding to the coffee preparation completion message among the coffee orders;
comparing identification information input from the a first user of the first user terminal in response to the identification information input request message with identification information transmitted to the first user terminal; and
when the identification information input from the first user is the same as the identification information transmitted to the first user terminal as a result of the comparison in the comparing of the identification information, requesting the coffee preparing apparatus to perform a provision operation on the coffee corresponding to the identification information transmitted to the first user terminal.

* * * * *